(12) United States Patent
Gómez García et al.

(10) Patent No.: US 12,338,779 B2
(45) Date of Patent: Jun. 24, 2025

(54) ACTUATION MECHANISM

(71) Applicant: INDUSTRIA DE TURBO PROPULSORES, S.A.U., Vizcaya (ES)

(72) Inventors: Alberto Gómez García, Vizcaya (ES); Ibon Ortiz De Zarate Etxeandia, Vizcaya (ES); Mikel Diez Celaya, Vizcaya (ES)

(73) Assignee: INDUSTRIA DE TURBO PROPULSORES, S.A.U., Vizcaya (ES)

( * ) Notice: Subject to any disclaimer, the term of this patent is extended or adjusted under 35 U.S.C. 154(b) by 0 days.

(21) Appl. No.: 18/768,015

(22) Filed: Jul. 10, 2024

(65) Prior Publication Data

US 2025/0035067 A1   Jan. 30, 2025

(30) Foreign Application Priority Data

Jul. 26, 2023  (EP) ..................................... 23382777

(51) Int. Cl.
| | |
|---|---|
| *F02K 1/00* | (2006.01) |
| *F02K 1/08* | (2006.01) |
| *F02K 1/12* | (2006.01) |
| *F02K 1/15* | (2006.01) |

(52) U.S. Cl.
CPC .............. *F02K 1/002* (2013.01); *F02K 1/008* (2013.01); *F02K 1/08* (2013.01); *F02K 1/12* (2013.01); *F02K 1/15* (2013.01); *F05D 2270/051* (2013.01)

(58) Field of Classification Search
CPC . F02K 1/002; F02K 1/008; F02K 1/12; F02K 1/1223; F02K 1/15
See application file for complete search history.

(56) References Cited

U.S. PATENT DOCUMENTS

| | | | | |
|---|---|---|---|---|
| 5,329,763 | A | * | 7/1994 | Ibarreche Mendia .. F02K 1/008 60/228 |
| 5,398,499 | A | * | 3/1995 | Urruela ................. F02K 1/1223 239/265.35 |
| 5,613,636 | A | * | 3/1997 | Zubillaga ............... F02K 1/1223 239/265.41 |
| 6,067,793 | A | * | 5/2000 | Urruela ................. F02K 1/1223 239/265.41 |
| 6,311,478 | B1 | | 11/2001 | Elorriaga Vicario et al. |

\* cited by examiner

*Primary Examiner* — Kyle Robert Thomas
(74) *Attorney, Agent, or Firm* — S.J. Intellectual Property LTD.

(57) ABSTRACT

The present invention belongs to the technical field of gas turbine engines used as propulsion systems for supersonic aircraft. In particular, the invention relates to thrust vectoring convergent-divergent nozzles and, more in particular, to an actuation mechanism for vectoring said variable geometry nozzle.

15 Claims, 3 Drawing Sheets

ACTUATION MECHANISM

TECHNICAL FIELD OF THE INVENTION

The present invention belongs to the technical field of gas turbine engines used as propulsion systems for supersonic aircraft. In particular, the invention relates to thrust vectoring convergent-divergent nozzles and, more in particular, to an actuation mechanism for vectoring said variable geometry nozzles.

BACKGROUND OF THE INVENTION

A gas engine propulsion system produces an axial thrust by momentum change of the high speed exiting gases though the aircraft exit nozzle. More in particular, ambient air enters the engine and is subsequently compressed in a compressor. Said compressed air is then heated by fuel injected in the combustion chamber. The hot exiting gas is then expanded in the turbine, where work is obtained and is used to drive the mentioned compressor. The expansion of the hot gasses continues in the nozzle, where the remaining energy of the gas is converted into a high velocity stream, responsible for the engine thrust. This thrust can vary between hundreds of newtons and hundreds of kilonewtons.

The nozzles currently employed in aircraft can be divided in two main groups, attending to the complexity of their geometry. In civil aviation, most common nozzles are shaped as a frustum-like duct, and are known as 'convergent nozzles'. Said convergent nozzles are provided with a fix ratio between their both ends, that is, the upstream end, or entering area, and the downstream end, or throat area.

In military engines with reheat capability, or 'afterburner', it is necessary to have a system that allows modifying the throat area. In this regard, some engines are provided with an additional divergent section extending from the convergent section (i.e., from the aforementioned throat area), through which gas expansion above sonic velocities can continue, thereby providing an increased thrust and a reduction in specific fuel consumption. This second group of nozzles is known as 'convergent-divergent' nozzles. Convergent-divergent nozzles make it possible to optimize the thrust for different flying conditions by varying the throat area and/or the exit area of the divergent section extending therefrom.

The manoeuvrability of aircraft is an essential factor, especially in those flight conditions in which the aerodynamic control surfaces begin to lose their efficiency. In case of aircraft provided with convergent-divergent nozzles, the manoeuvrability can be improved by vectoring the thrust away from its conventional axial orientation, that is by changing the geometry of the divergent nozzle section, but maintaining the convergent section in an axil-symmetric disposition.

There are several known mechanisms for vectoring thrust in this type of nozzles. In this regard, some architectures of thrust vectoring variable geometry nozzles include the possibility to modify independently said throat and exit areas, and are known as 'biparametric nozzles', or even the possibility of allowing to orientate the thrust in pitch, but not in yaw.

However, said designs for thrust vectoring variable geometry nozzles cause distortion of the geometry of the exit area, from a circular to an elliptical shape, limiting the maximum reachable variation of the exit area without modifying the throat area.

Thus, there is a need for a mechanism provided with enough degrees of freedom to control the geometry of the throat area and exit area of a nozzle, while allowing its vectorization, without distorting the circular geometry of the exit area.

SUMMARY OF THE INVENTION

The present invention provides a solution to the aforementioned problems by an actuation mechanism for a thrust vectoring variable geometry nozzle of a gas turbine engine according to claim 1, a thrust vectoring variable geometry nozzle according to claim 12, a gas turbine engine according to claim 14 and an aircraft according to claim 15. Advantageous embodiments are defined in the dependent claims.

In a first inventive aspect, the invention provides an actuation mechanism for a thrust vectoring variable geometry nozzle of a gas turbine engine, the actuation mechanism comprising:

a first ring;
a second ring;
a third ring;
first actuating means; and
second actuating means;
wherein according to at least one operational status of the first and second actuating means the three rings are arranged concentrically and about a longitudinal axis;
wherein the first actuating means are configured to exert a pushing or pulling force in the direction of the longitudinal axis on at least two diametrically opposed actuation points of the second ring;
wherein the second actuating means are configured to exert a pushing or pulling force in the direction of the longitudinal axis on at least two diametrically opposed actuation points of the third ring;
wherein in said operational status of the first and second actuating means:
the longitudinal axis and the line connecting the actuation points of the second ring define a first plane,
the longitudinal axis and the line connecting the actuation points of the third ring define a second plane; and
the first plane and the second plane are perpendicular;
and wherein:
the first ring has the smallest diameter among the three rings, and is configured to be coupled to a distal fixed portion of the nozzle by means of an axial sliding joint arranged in the direction of the longitudinal axis, such that in an operating mode of the actuation mechanism the first ring is configured to move axially with respect to said distal fixed portion of the nozzle;
the third ring is connected to the second ring by means of at least one axial sliding joint arranged in the direction of the longitudinal axis, such that the third ring and the second ring are configured to move axially relative to each other;
the third ring is further connected to the first ring by means of at least one cylindrical joint arranged on the second plane, wherein said cylindrical joint is configured to allow a relative rotation between the third ring and the first ring around a rotation axis perpendicular to the longitudinal axis.

As aforementioned, thrust vectoring is the ability of an aircraft, rocket, or any other vehicle to control the direction of the thrust generated by the engines and, more in particular, gas turbines, to control the attitude or angular velocity of the vehicle and thus improve the manoeuvrability of said vehicle.

Also, convergent-divergent nozzles make it possible to optimize the thrust for different flying conditions by varying the throat area and/or the exit area of the divergent section extending therefrom.

The actuation mechanism of the invention is capable of providing a combination of movements which, once said mechanism is implemented in the thrust vectoring variable geometry nozzle of an aircraft, are capable of generating, in the transformable elements of said nozzle which define the convergent and divergent section thereof, the movements associated both with vectoring (i.e., the orientation of the jet engine exhaust), and with the control of throat and exit areas. Moreover, all these movements will be independent of each other and can be combined as desired at each moment of the operation.

In this regard, the actuation mechanism of the invention comprises three rings concentric among themselves and about a longitudinal axis according to at least one operational status of the first and second actuating means. Throughout the document, the condition of concentricity of the three rings will be understood as the position in which there is no relative rotation between the different rings.

In this sense, once the actuation mechanism is mounted as part of a nozzle of an aircraft engine, this position will correspond to a position in which there is no vectoring of the nozzle.

When the actuation mechanism is mounted as part of a nozzle of a gas turbine engine of an aircraft, said longitudinal axis is coincident with the longitudinal axis of the gas turbine engine. Thus, the three rings are configured for being arranged also concentric with the longitudinal axis of a gas turbine engine of an aircraft. It shall be understood that, in an operating mode of the actuation mechanism, with the actuation mechanism mounted as a part of the nozzle of a gas turbine engine of an aircraft, the longitudinal axis corresponds to the main direction of the air flow through the gas turbine engine according to the upstream-downstream direction, that is, from the inlet to the outlet, passing through the different stages of the compressor, combustion chamber, turbine and nozzle.

As for the means for generating the relative movements between these rings, which in turn translate, once implemented as part of a thrust vectoring variable geometry nozzle of an aircraft engine, into the movements of the elements defining the convergent and divergent sections of that nozzle, said three rings are connected together via linkage and guide elements which allow either relative axial displacement or relative rotary movement.

The first ring is configured to be coupled to a distal fixed portion of the nozzle by means of an axial sliding joint arranged in the direction of the longitudinal axis.

Axial sliding connections are designed to provide a degree of freedom along a longitudinal direction. In particular, one element is allowed to slide freely in said longitudinal direction, coupled to another element by means of any kind of flange inserted in a groove, track or rail structure. This configuration of the first ring provides a first degree of freedom such that, once implemented in a thrust vectoring variable geometry nozzle, it allows the first ring to move axially, for example, to provide control over the convergent section of the nozzle. However, loads having a direction oblique to the direction of the groove, for example, loads that would tend to rotate the first ring with respect to the distal fixed portion of the nozzle, produce interference of the flange (i.e. bolt) with the edge of the groove, thus preventing the relative rotation of one with respect to the other.

In order to describe the relative arrangement between the three rings, reference is made to the operational status of the first and second actuating means according to which the three rings are arranged concentrically. According to this position, two planes perpendicular to each other are defined. These planes intersect the three rings in diametrically opposed sections, defining the geometric locations of the elements which allow relative movement between rings. That is, the corresponding actuation points where the actuation means exert a pushing or pulling force that displaces the rings, as well as the cylindrical joints that allow rotation around their associated rotation axis.

The third ring is connected to the first ring by means of at least one cylindrical joint arranged on the second plane defined by the line connecting the actuation points of the second ring and the longitudinal axis. By virtue of said cylindrical joint, relative rotation between the first ring and the third ring is allowed around a rotation axis passing through said cylindrical joint and perpendicular to the longitudinal axis.

Regarding the cylindrical joint described, it shall be preferably embodied as a shaft-hole type connection which allows rotation around the longitudinal direction of the shaft, but prevents any relative translational movement in a plane perpendicular to said longitudinal direction of the shaft, so that any linear movement of the shaft brings it into contact with the contour of the structure defining the hole.

In this way, the first ring and the third ring, joined by means of at least one cylindrical joint, can rotate with respect to each other around the rotation axis, but axial movements tending to displace the first or third ring in a linear manner causes the other ring, by means of the corresponding cylindrical joint, to be dragged together.

Accordingly, an additional degree of freedom is provided to the actuation mechanism, allowing the third ring to rotate independently of the first ring, so that the rotation of the third ring does not affect the axial displacement of the first ring.

As aforementioned, some rings are guided, this is, connected together via guide elements which allow relative axial displacement. In this regard, the third ring is connected to the second ring by means of at least one axial sliding joint arranged in the direction of the longitudinal axis. By virtue of said axial sliding joint, the third ring and the second ring are allowed to move, relative to each other, along a direction parallel to the longitudinal axis. The second ring and the third ring are thus axially guided by the at least one axial sliding joint in the sense that rotation and transverse displacement of the third ring with respect to the second ring is prevented by means of the at least one axial sliding joint that only allows axial relative moment.

Accordingly, an additional degree of freedom is provided to the actuation mechanism, allowing the second ring and the third ring to move axially with respect to each other. However, loads having a direction oblique to the longitudinal axis, for example, loads that would tend to rotate the third ring with respect to the second ring, produce reaction loads on the axial sliding joints, causing both rings to rotate together, thus preventing the relative rotation of one with respect to the other. This configuration of the third ring and the second ring thus provides a relative axial movement that, once implemented in a thrust vectoring variable geometry nozzle, allows the second ring to move axially, for example, to provide control over the divergent section of the nozzle.

By virtue of the relative sliding freedom between the second ring and the third ring, the relative rotational freedom between the third ring and the first ring, and the sliding freedom of the first ring with respect to a distal fixed portion of the nozzle, the actuation mechanism of the invention, once implemented as part of an engine nozzle, allows controlling the convergent and divergent sections of the nozzle. In this way, the exit area of the nozzle is controlled, both in terms of the degree of opening or closing, independently of the throat section, and in terms of vectoring angle and direction.

In order to generate the relative movements described above, the actuation mechanism comprises first actuating means and second actuating means. The first actuating means are configured to exert a force in the direction of the longitudinal axis on at least two diametrically opposed actuation points of the second ring arranged on the first plane. The force applied at each actuation point can be a pushing force or a pulling force. In this sense, the force provided at each of at least two diametrically opposed points of the second ring may have the same direction, either pushing or pulling, or it may have a different direction, pushing at one actuation point and pulling at the diametrically opposed actuation point.

In particular, in the case that the first actuating means act on the pair of diametrically opposed actuation points of the second ring, applying a pushing or pulling force in the same direction, and producing the same displacement of said actuation points, the second ring will be displaced axially, with no rotation component thereof.

However, in the event that the force applied at both diametrically opposed actuation points of the second ring by means of the first actuating means has an opposite direction and produces the same displacement (in opposite directions) of each actuation point, the second ring will rotate (dragging the third ring with it) around the cylindrical joint around the axis of rotation. Therefore, there is no axial translation of the second ring.

Finally, in the case where the displacement produced by each respective force applied at the two diametrically opposed actuation points is different (regardless of whether the force is applied in the same direction or in opposite directions), the second ring will rotate (dragging the third ring with it) around the cylindrical joint, around the axis of rotation), and will also be displaced axially.

The second actuating means are configured to exert a force in the direction of the longitudinal axis on at least two diametrically opposed actuation points of the third ring arranged on the second plane. The second actuating means actuate synchronously at both actuation points, either by pushing in one direction or by pulling in the opposite direction, since the second ring and the third ring cannot rotate relative to each other, as they are not coupled by means of a cylindrical joint. However, the second ring and the third ring can slide axially relative to each other by means of their coupling by means of an axial joint.

In this regard, in the case that the second actuating means act on the pair of diametrically opposed actuation points of the third ring, applying a pushing or pulling force in the same direction, and producing the same displacement of said actuation points, the third ring will be displaced axially, with no rotation component thereof.

In a particular embodiment, the first actuating means are connected to the second ring by means of a spherical joint.

In an embodiment, the second actuating means are connected to the third ring by means of a cylindrical joint.

In a particular embodiment, the first actuating means comprise a pair of hydraulic actuators, each actuator connected to one of the two diametrically opposed actuation points on the second ring.

In a particular embodiment, the first actuating means comprise a pair of electric actuators, each actuator connected to one of the two diametrically opposed actuation points on the second ring.

In a particular embodiment, the second actuating means comprise a pair of hydraulic actuators, each actuator connected to one of the two diametrically opposed actuation points on the third ring.

In a particular embodiment, the second actuating means comprise a pair of electric actuators, each actuator connected to one of the two diametrically opposed actuation points on the third ring.

In a particular embodiment, the third ring is connected to the first ring by means of two diametrically opposed cylindrical joints arranged on the second plane.

In a particular embodiment, at least one first cylindrical joint comprises a bolt provided on the first ring, said bolt being inserted in a hole provided on the third ring.

In a particular embodiment, at least one bolt is a cylindrical bolt, said cylindrical bolt being inserted in a circular hole provided on the third ring.

In a particular embodiment, at least one cylindrical joint comprises a bolt provided on the third ring, said bolt being inserted in a hole provided on the first ring.

In a particular embodiment, at least one bolt is a cylindrical bolt, said cylindrical bolt being inserted in a circular hole provided on the first ring.

In a particular embodiment, the axial sliding joint provided between the second ring and the third ring comprises a cylindrical bolt provided on one of the second and third rings, said cylindrical bolt being inserted in an axial groove arranged parallel to the longitudinal axis, said axial groove being provided on the other of the second and third rings.

In a particular embodiment, at least three axial sliding joints are provided between the third ring and the fourth ring.

In a particular embodiment, the second ring has a greater diameter than the third ring.

In a particular embodiment, the third ring has a greater diameter than the second ring.

In a particular embodiment, the second ring and the third ring have substantially the same diameter, wherein the first actuating means axially pass through the third ring.

In an embodiment wherein the actuation mechanism is implemented as part of a thrust vectoring variable geometry nozzle of an aircraft engine, the second ring is arranged in a position downstream of the third ring according to the direction of the longitudinal axis.

In a second inventive aspect, the invention provides a thrust vectoring variable geometry nozzle comprising:
  an actuation mechanism according to any embodiment of the first inventive aspect;
  a plurality of convergent petals, each convergent petal being coupled:
    by a corresponding pivot joint to the first ring; and
    by means of a cam joint to a distal fixed portion of the nozzle;
  a plurality of divergent petals, each divergent petal being coupled:
    at a proximal end thereof to a distal end of a convergent petal by means of a pivot joint;
    to the second ring of the actuation mechanism by means of a load strut;
wherein each load strut is connected at one end to the second ring by means of a pivot joint, and at the other end to a corresponding divergent petal by means of a spherical joint.

As aforementioned, vectoring nozzles of variable geometry for gas turbines comprise a convergent section followed in the thrust direction by a divergent section. The convergent section defines a variable geometry throat, and the divergent section has a variable geometry to vector the thrust.

Regarding the convergent section, the thrust vectoring variable geometry nozzle of the invention comprises a plurality of convergent petals, each convergent petal being coupled by a corresponding pivot joint to the first ring of the actuation mechanism and to a distal fixed portion of the nozzle by means of a cam joint.

In turn, the divergent section is defined by a plurality of divergent petals, each divergent petal being coupled by a proximal end thereof to a distal end of a convergent petal by means of a pivot joint and to the second ring of the actuation mechanism by means of a load strut. Each of said load struts is connected at one end to the second ring by means of a pivot joint, and at the other end to a corresponding divergent petal by means of a spherical joint.

Regarding the articulations of the convergent and divergent petals, to allow the combination of movements that provide the vectorization of the nozzle, as well as the independent control of the throat and exit areas of the divergent section, the position and orientation of every divergent petal is governed by its link to the convergent section, that is, by means of the corresponding pivot joint with the corresponding convergent petal, and by its link to the second ring by means of a strut. The pivot joints permit the lateral and radial motion of the divergent petals for allowing orientation of the flow, i.e., vectorization. In this regard, the spherical joint by means of which each strut is connected to a corresponding divergent petal permits relative rotation to accommodate to said lateral and radial motion of the divergent petals.

Regarding the actuation of said convergent and divergent petals to modify the throat area, as well as the exit area and the thrust orientation (i.e., vectorization), the thrust vectoring variable geometry nozzle of the invention includes an actuation mechanism according to any embodiment of the first inventive aspect.

In particular, the first ring of the actuation mechanism is coupled to a distal fixed portion of the nozzle by means of an axial sliding joint arranged in the direction of the longitudinal axis, such that in an operating mode of the actuation mechanism the first ring is configured to move axially with respect to said distal fixed portion of the nozzle.

In this sense, by virtue of the cam joint by means of which each convergent petal is coupled to a distal fixed portion of the nozzle, axial movement of the first ring with respect to the distal fixed portion of the nozzle in the downstream direction pivots the convergent petals, deflecting them inwardly into the throat of the nozzle, decreasing the area of the throat thereby in an axil-symmetric manner, but without producing vectorization.

Additionally, by means of the relative movement of each of the rings of the actuation mechanism, caused by the operation of the first and second actuating means thereof, the thrust vectoring variable geometry nozzle is capable of independent axil-symmetrically variating the convergent section throat area and the divergent section exit area, as well as controlling the orientation of the thrust by coordinated motion of the divergent petals.

In particular, the first actuating means are configured to exert a pushing or pulling force on the second ring in the direction of the longitudinal axis. In turn, the second actuating means are configured to exert a pushing or pulling force on the third ring in the direction of the longitudinal axis.

Said first actuating means are responsible for the control of the nozzle exit area as well as the vectoring of the nozzle in a direction parallel to the line connecting the actuation points of the second ring, this is, around the line connecting the actuation points of the third ring.

In particular, the operation of the first actuating means in the same direction causes the axial translation of the second ring, which can slide relatively on the third ring. This axial movement of the second ring also causes the displacement of the load struts, which in turn drag or push the diverging petals, thereby opening (i.e., increasing) or closing (i.e., decreasing), respectively, the exit area of the nozzle.

As for the vectorization of the nozzle in a direction parallel to the line connecting the actuation points of the second ring, if the force applied by the first actuating means on each actuation point has different direction and produces different displacement of said actuation points, in addition to modifying the exit area, vectorization of the nozzle is produced. In particular, the second ring drags the third ring (which, in turn, pivots respect to the first ring around the at least one cylindrical joint).

In other words, if the force applied on each actuation point by the first actuating means has different direction and produces a different displacement of said actuation points, the axial position of the second ring varies so it modifies the exit area apart from vectorising the nozzle.

However, if the force applied on each actuation point produces the same displacement of the actuation points (in opposite directions), the second ring is not displaced axially, thus vectorising the nozzle without modifying the exit area.

Regarding the second actuating means, they are responsible for the control of the nozzle throat area.

In particular, the operation of the second actuating means in the same direction causes the axial translation of the third ring, which in turn drags the first ring by virtue of their coupling by means of the at least one cylindrical joint, which allow relative rotation, but no relative axial movement. This combined axial movement of the third and first ring causes the convergent petals to pivot inwardly/outwardly, thus decreasing/increasing the area of the throat thereby, but without producing vectorization.

It shall be understood that the nozzle may be implemented on an aircraft in any desired position. In this regard, depending on the relative position of the cylindrical joint which allows rotational movement of the third ring with respect to the first ring, it will be possible to determine the vectoring produced by the nozzle with respect to the aircraft.

In this regard, in a particular embodiment corresponding to a position of the nozzle where the rotation axis of the cylindrical joint joining the third ring and the first ring is parallel to the horizontal axis (or pitch axis of the aircraft), the vectoring of the nozzle allows pitching of the aircraft. On the other hand, in a particular embodiment corresponding to a position where the rotation axis of the cylindrical joint joining the third ring and the first ring is parallel to the vertical axis (or yaw axis of the aircraft), the vectoring of the nozzle allows the aircraft to rotate around said yaw axis.

In a particular embodiment, the cam joint comprises complementary interlocking means present in the convergent petals and in the distal fixed portion of the nozzle, respectively, such that axial movement of the first ring with respect to the distal fixed portion of the nozzle in the downstream direction according to the longitudinal axis pivots the convergent petals, deflecting them inwardly into the throat of the nozzle.

In an embodiment, the complementary interlocking means comprise a curved profile or protuberance provided on the convergent petals and a roller, cylinder, or other curved surface provided at the distal end of the nozzle, such that, by means of the axial sliding of the first ring over the distal fixed portion of the nozzle, the curved profile of the convergent petals means roll over the curved surface element of the distal end of the nozzle, translating the longitudinal movement of the first ring into a deflection of the converging petals, closing inward or opening from the inside of the nozzle depending on the direction of axial advance or retreat of the first ring.

In a third inventive aspect, the invention provides a gas turbine engine comprising a thrust vectoring variable geometry nozzle according to any embodiment of the second inventive aspect.

In a fourth inventive aspect, the invention provides an aircraft comprising a gas turbine engine according to the third inventive aspect.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Once the object of the invention has been outlined, specific non-limitative embodiments are described hereinafter.

Figure 1:
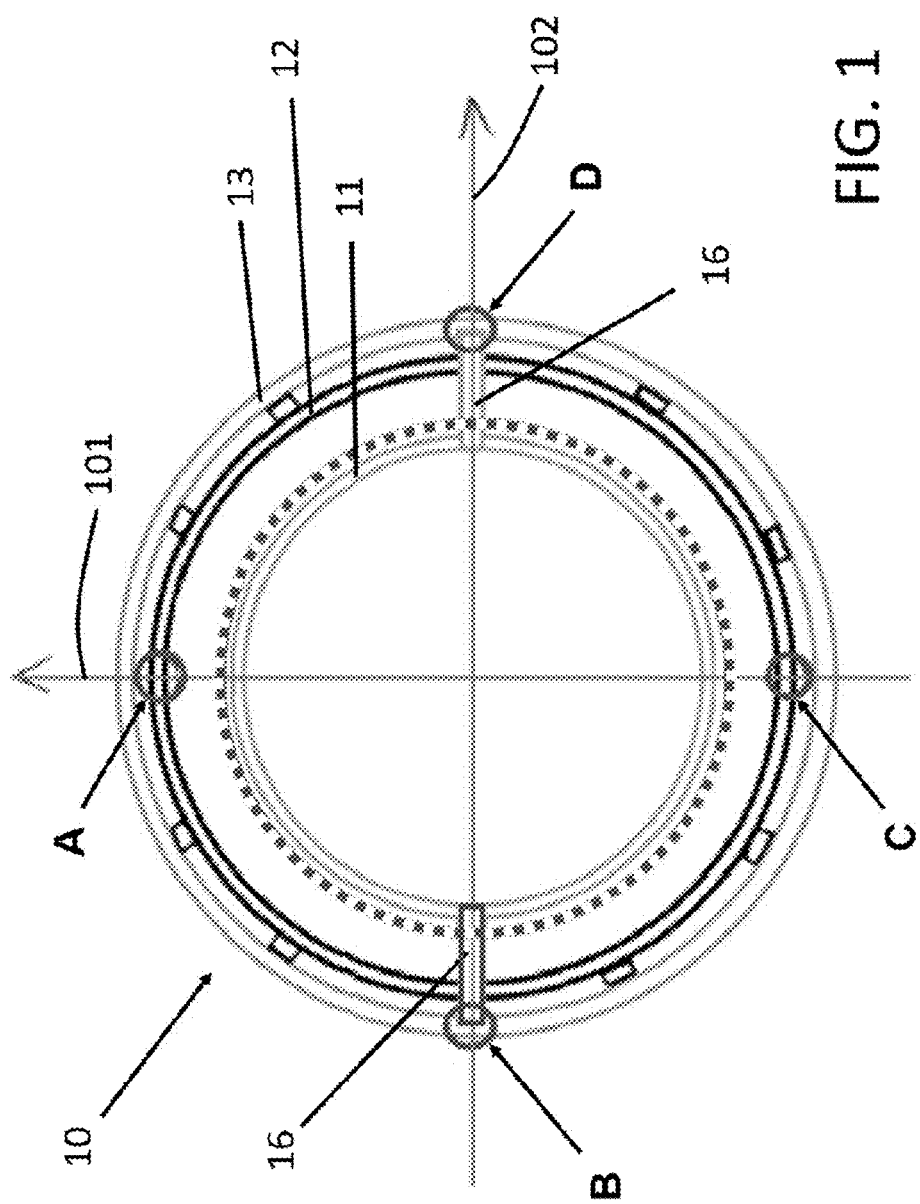
FIG. 1 This figure shows a schematic cross-sectional view, according to a plane perpendicular to the longitudinal axis, of an actuation mechanism according to an embodiment of the invention.

More specifically, the basic architecture of the actuation mechanism is described in relation to the particular embodiment shown in FIG. 1, where the connections between the different rings of the actuation mechanism which allow the relative movements between them are shown.

Later on, the actuation per se of said actuation mechanism, i.e., the operation and effect of the relative movements permitted by virtue of the described connections, is described with reference to FIGS. 2a and 2b, where the actuation mechanism is shown as part of a thrust vectoring variable geometry nozzle (20) comprising a plurality of petals (corresponding arrays of convergent petals and divergent petals coupled to them). Thus, by virtue of the movements provided by the actuation mechanism, vectoring of said nozzle (20) occurs.

In connection with the above, FIG. 1 shows a schematic cross-sectional view, according to a plane perpendicular to the longitudinal axis, of an actuation mechanism (10) for a thrust vectoring variable geometry nozzle of a gas turbine engine, according to an embodiment of the invention.

In particular, the actuation mechanism (10) shown comprises a first ring (11), a second ring (12) and a third ring (13). The actuation mechanism (10) also comprises first actuating means and second actuating means.

As can be seen, the actuation mechanism is set in an operational configuration wherein the first actuating means (not shown) and second actuating means (not shown) are in an operational status according to which the three rings (11, 12, 13) are arranged concentrically about a longitudinal axis, and in this embodiment said three rings (11, 12, 13) have the following diameter ratios:

the first ring (11) has the smallest diameter among the three rings;
the second ring (12) has a larger diameter than the first ring (11); and
the third ring (13) has a larger diameter than the second ring (12).

As for the longitudinal axis, it will be understood that, when the actuation mechanism is mounted as part of a nozzle of a gas turbine engine, the longitudinal axis corresponds to the longitudinal axis of the gas turbine engine and to the main direction of the air flow through the gas turbine engine, from the inlet to the outlet, passing through the different stages of the compressor, combustion chamber, turbine and nozzle in an operating mode of the gas turbine engine.

The first actuating means are configured to exert a pushing or pulling force on the second ring (12) in the direction of the longitudinal axis.

The second actuating means are configured to exert a pushing or pulling force on the third ring (13) in the direction of the longitudinal.

To describe the relative arrangement between the three rings (11, 12, 13) in relation to the operational configuration of the actuation mechanism (10) shown in FIG. 1, two planes (101, 102) perpendicular to each other are defined (in the figure they are represented as two axes, one horizontal axis and one vertical axis, with arrowheads at one of their ends, pointing respectively upwards and to the right). These planes intersect the three rings (11, 12, 13) in diametrically opposed sections, defining the geometric locations of the elements allowing relative rotation between rings (11, 12, 13), that is, the corresponding actuation points wherein the actuating means exert a pushing or pulling force that displaces the rings (11, 12, 13), as well as the cylindrical joints (16) that allow rotation around their associated rotation axis.

In particular, as can be seen, the first plane (101), passes through two diametrically opposed points A and C of the second ring (12), marked with a first pair of grey circles. In the particular embodiment shown, A is taken as a counter-clockwise angular reference, corresponding to an angle of 0 degrees. On the other hand, position C corresponds to an angle of 180 degrees. In turn, the second plane (102), passes through two diametrically opposed points B and D of the third ring (13), marked with a second pair of grey circles. As shown, taking A as the angular reference, B corresponds to an angle of 90 degrees and D corresponds to an angle of 270 degrees.

In this embodiment, the actuation points of the first actuating means on the second ring (12) are arranged at the positions A and C and are hidden by the second ring (12), such that they are not visible in the view shown in FIG. 1. The actuation points of the second actuating means on the third ring (13) are arranged at the positions B and D and are hidden by the third ring (13), such that they are not visible in the view shown in FIG. 1.

The third ring (13) is connected to the second ring (12) by means of at least one axial sliding joint arranged in the direction of the longitudinal axis. Different embodiments of said axial sliding joint comprise a cylindrical bolt provided on either the second ring (12) or the third ring (13). Said cylindrical bolt is inserted in an axial groove arranged parallel to the longitudinal axis, and provided on the corresponding opposed second (12) or third (13) ring. By virtue of said axial sliding joint, the third ring (13) and the second ring (12) are allowed to move, relative to each other, along a direction parallel to the longitudinal axis.

Additionally, as can be seen in the particular embodiment shown in FIG. 1, the third ring (13) is connected to the first ring (11) by means of two diametrically opposed cylindrical joints (16) arranged on the second plane (102). In the embodiment shown in FIG. 1, each of said cylindrical joints (16) is implemented as a cylindrical bolt provided on the first ring (11), said bolt being inserted in a circular hole provided on the third ring (13). In the particular embodiment shown the third ring (13) has a greater diameter than the second ring (12), and the second ring (12) is interposed between the third ring (13) and the first ring (11). According to this embodiment, the connection (i.e. the cylindrical joint (16) shown) between the first ring (11) and the third ring (13) passes through some perforation or groove provided in said second ring (12). According to other embodiments, the second ring (12) may have a greater diameter than the third ring (13); or the second ring (12) and the third ring (13) may have substantially the same diameter, the first actuating means axially passing through the third ring (13) according to said embodiment.

Regarding the cylindrical joints (16) described, it is understood that all kinds of shaft-hole connections allow rotation around the longitudinal direction of the shaft (i.e., the cylindrical bolts), but prevent any relative translational movement in a plane perpendicular to said longitudinal direction of the shaft, so that any linear movement of the cylindrical bolt brings it into contact with the contour of the structure defining the hole.

In this way, the first (11) and third (13) rings joined by means of the cylindrical joints (16) can rotate with respect to each other, but axial movements tending to displace any of the connected rings (11, 13) in a linear manner cause the other ring, by means of the cylindrical joint (16), to be dragged together.

In turn, axial sliding joints are designed to provide a degree of freedom opposed to that of the aforementioned cylindrical joints (16). In particular, one element is allowed to slide freely in a longitudinal direction, coupled to another element by means of any kind of flange inserted in a groove. That is, the third (13) and second (12) rings, joined by means of an axial sliding joint, are allowed to move axially relative to each other. However, loads having a direction oblique to the direction of the groove, for example, loads that would tend to rotate one ring with respect to the other, produce interference of the flange (i.e. bolt) with the edge of the groove, which causes both rings to rotate together, thus preventing the relative rotation of one ring with respect to the other.

The first ring (11) is configured to be coupled to a distal fixed portion of the nozzle by means of an axial sliding joint arranged in the direction of the longitudinal axis, such that in an operating mode of the actuation mechanism (10) the first ring (11) is configured to move axially with respect to said distal fixed portion of the nozzle. In FIG. 1, said distal fixed portion is represented by a circumference with a dashed line with a diameter larger than the first ring (11) and smaller than the second ring (12).

As indicated above, the operation of the elements of the actuation mechanism for a thrust vectoring variable geometry nozzle (20) described in relation to FIG. 1 produces a series of effects that cause the variation of the geometry of said nozzle (20), i.e., its vectorization. Said effects are described below with reference to FIGS. 2a-2b, wherein said actuation mechanism is implemented as part of a thrust vectoring variable geometry nozzle (20) comprising a plurality of petals (21, 23) defining a convergent section and a divergent section of said nozzle (20).

Figure 2:
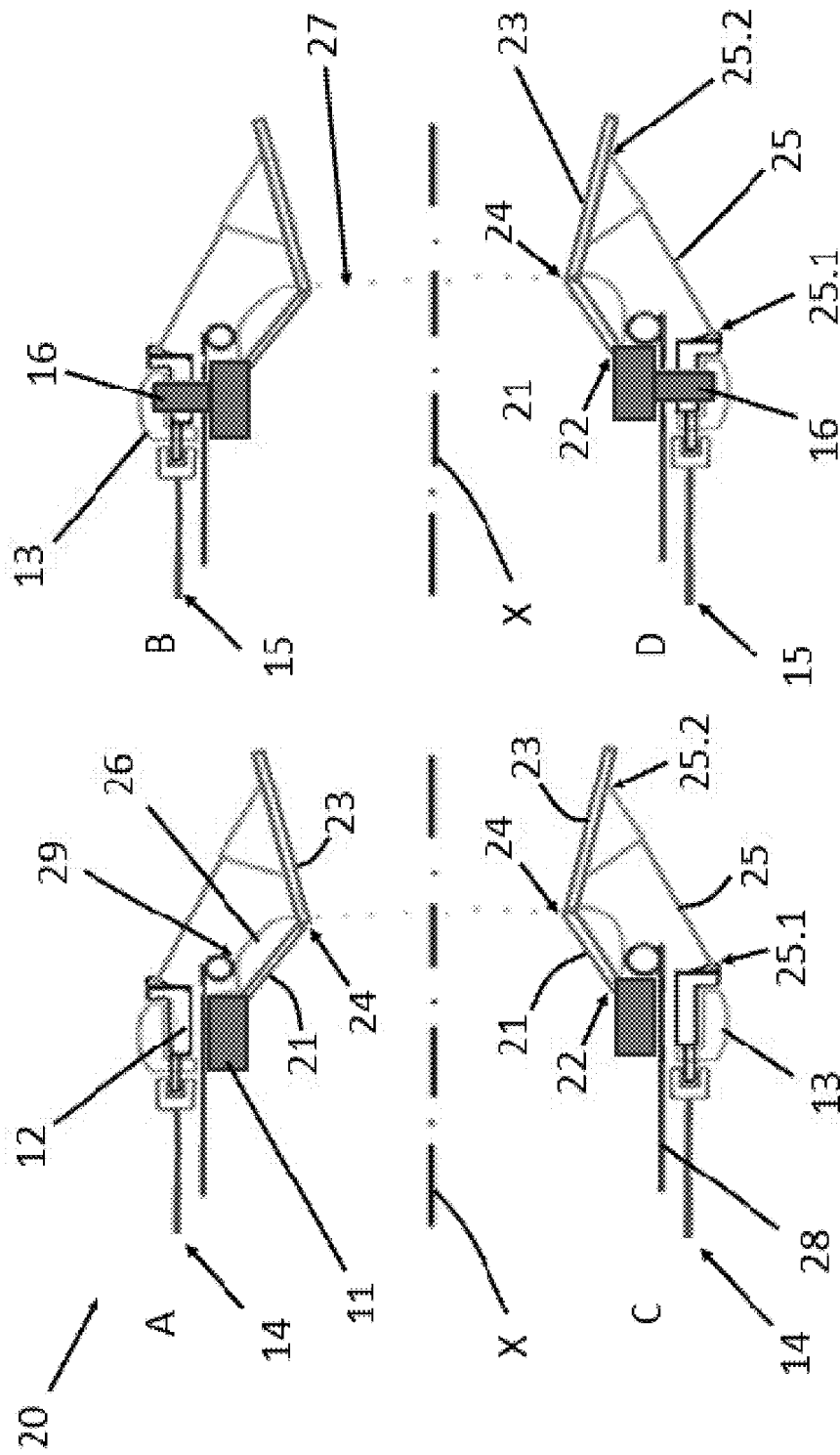
FIGS. 2a-b These figures show, respectively, schematic representations of a section of a thrust vectoring variable geometry nozzle according to an embodiment of the invention.

In particular, FIGS. 2a-2b show cross-sectional views of a section of a thrust vectoring variable geometry nozzle (20) according to an embodiment of the invention. More in particular, FIG. 2a corresponds to a cross-sectional view according to the first plane (101) corresponding, in FIG. 1, to the vertical line passing through two diametrically opposed points of the second ring (12) marked with a first pair of grey circles. In turn, FIG. 2b corresponds to a cross-sectional view according to the second plane (102) corresponding, in FIG. 1, to the horizontal line passing through two diametrically opposed points of the third ring (13) marked with a second pair of grey circles.

The thrust vectoring variable geometry nozzle (20) shown comprises an actuation mechanism (10) comprising all of the features of the embodiment described in connection with FIG. 1, except for a single structural modification according to which the second ring (12) and the third ring (13) have substantially the same diameter, wherein the second ring (12) is arranged in a position downstream of the third ring (13) according to the direction of the longitudinal axis (X) of the gas turbine engine (30).

The nozzle (20) further comprises a convergent section and a divergent section, where the virtual plane defining the connecting interface between one section and the other corresponds to the throat (27) area of the nozzle (20).

The convergent section of the nozzle (20) is defined by a plurality of convergent petals (21), each convergent petal (21) being coupled by a corresponding pivot joint (22) to the first ring (11) of the actuation mechanism and to a distal fixed portion (28) of the nozzle (20) by means of a cam joint (29).

As aforementioned, the first ring (11) of the actuation mechanism is coupled to a distal fixed portion of the nozzle (20) by means of an axial sliding joint arranged in the direction of the longitudinal axis (X) of the gas turbine engine, such that in an operating mode of the nozzle (20) the first ring (11) is configured to move axially with respect to said distal fixed portion of the nozzle (20).

In this sense, as can be seen, the cam joint (29) comprises complementary interlocking means (26) attached to the convergent petals (21) and to the distal fixed portion (28) of the nozzle (20), respectively, such that axial movement of the first ring (11) with respect to the distal fixed portion (28) of the nozzle (20) in the downstream direction pivots the convergent petals (21), deflecting them inwardly into the throat (27) of the nozzle (20), decreasing the area of the throat (27) thereby in an axil-symmetric manner, but without producing vectorization.

In turn, the divergent section of the nozzle (20) is defined by a plurality of divergent petals (23). Each divergent petal (23) is coupled at a proximal end thereof to a distal end of a convergent petal (21) by means of a pivot joint (24). Also, each divergent petal (23) is coupled to the second ring (12) of the actuation mechanism by means of a load strut (25). In an embodiment the load strut (25) is coupled to a distal portion of the divergent petal (23). Each of said load struts (25) is connected at one end to the second ring (12) by means of a pivot joint (25.1), and at the other end, as described, to a corresponding divergent petal (23) by means of a spherical joint (25.2).

With the described architecture of the elements which are part of the nozzle (20), and by means of the relative movement of each of the rings (11, 12, 13) of the actuation mechanism, the operation of the nozzle (20) shown in FIGS. 2a and 2b would be as described below.

As aforementioned and as can be seen, the actuation mechanism comprises first actuating means (14) configured to exert a pushing or pulling force on the second ring (12) in the direction of the longitudinal axis (X) of the turbine gas engine.

In the particular embodiment shown in FIG. 2a, the actuation points of the first actuating means (14) on the second ring (12) are arranged on the first plane (101) corresponding to the vertical line shown in relation to FIG. 1. In this regard, taking said vertical line of FIG. 1 as a reference which corresponds to a vertical midplane of the nozzle (20), the angular positions of said actuation points correspond to the positions A and C defined in relation to FIG. 1. In this sense, the angular positions for each actuation point are about 0 degrees and about 180 degrees, respectively. In a particular embodiment, said vertical midplane corresponds to the main vertical plane of the aircraft defined by its longitudinal axis (X) and the vertical axis. According to this embodiment, rotation around said vertical axis produces yaw vectorization and the pitch movement takes place in said main vertical plane.

The force provided at each of said opposed actuation points of the second ring (12) may have the same direction, either pushing or pulling, or it may have a different direction, pushing at one actuation point and pulling at the diametrically opposed actuation point.

According to particular embodiments, the first actuating means (14) comprise a pair of hydraulic actuators axially passing through the third ring (13), each one connected to one of the two diametrically opposed actuation points of the second ring (12).

As mentioned, the actuation mechanism further comprises second actuating means (15) configured to exert a pushing or pulling force on the third ring (13) in the direction of the longitudinal (X) axis of the gas turbine engine.

As can be seen, in the particular embodiment shown, the actuation points of the second actuating means (15) on the third ring (13) are arranged on the second plane (102) corresponding to the horizontal line shown in FIG. 1. The angular positions of said diametrically opposed actuation points correspond to the positions B and D defined in relation to FIG. 1. In this sense, the angular positions for each actuation point are about 90 degrees and about 270 degrees, respectively.

The second actuating means (15) are configured to exert a force in the direction of the longitudinal axis (X) on each of said diametrically opposed actuation points of the third ring (13) arranged on the second plane (102). The second actuating means (15) actuate synchronously at both actuation points, either by pushing in one direction or by pulling in the opposite direction, since the second ring (12) and the third ring (13) cannot rotate relative to each other, as they are not coupled by means of a cylindrical joint. However, the second ring (12) and the third ring (13) can slide axially relative to each other by means of their coupling by means of an axial joint.

According to particular embodiments, the second actuating means (15) comprise a pair of hydraulic actuators, each one connected to one of the two diametrically opposed actuation points on the third ring (13).

Based on the above, the first (14) and second (15) actuating means may act on the basis of different operational statuses depending on the relative position of the rings (11, 12, 13) to be established. In FIG. 1, a configuration of the actuation mechanism (10) has been described based on an operational status of the first (14) and second (15) actuating means that causes no rotation or relative translation between the rings (11, 12, 13). Examples of different operating configurations of the actuation mechanism (10) are described below in which, once implemented in a nozzle (20), the action of the actuation means (15, 16) produces relative translation and/or rotation movements of the rings (11, 12, 13) which, in turn, result in the control of the throat (27) and exit areas as well as the vectoring of the nozzle (20).

A combination of nozzle (20) movements produced by the actuation mechanism (10) is described with reference to the main axes and movements of an aircraft, i.e. pitch and yaw. In this sense, it will be assumed that the planes (101, 102) defined for the actuation mechanism (10) described in FIG. 1 comprise, respectively, the pitch and yaw axes. In this regard, the first plane (101) defined by the vertical line corresponds to the vertical plane where the pitch movement of the aircraft takes place, and the second plane (102) defined by the horizontal line corresponds to the horizontal plane where the yaw movement of the aircraft takes place. The following movements are described:

the actuation of the first actuating means (14) which produce vectorization of the nozzle (20) in the pitch direction, and the synchronous (i.e., the same displacement in the same direction) actuation of the second actuating means (15) which causes the axial translation of the third ring (13), which in turn drags the first ring (11) by virtue of their coupling by means of the cylindrical joint (16), which prevents relative axial movement. According to this axial movement of the first ring (11), control of the nozzle (20) throat area (27) is exerted.

In a different embodiment from the one shown in FIGS. 2a-2b, the rotation axis of the cylindrical joint (16) joining the third ring (13) and the first ring (11) is parallel to the vertical axis (or yaw axis of the aircraft), and the vectoring of the nozzle (20) allows the aircraft to rotate around said yaw axis.

However, it is understood that both the actuation mechanism (10) and the nozzle (20) may be implemented on an aircraft in any desired position where the planes (101, 102) described in relation to FIG. 1 do not comprise the pitch and yaw axes of the aircraft. The cylindrical joint (16), which allows rotational movement of the third ring (13), defines the position of the rotation axis. The relative arrangement of said rotation axis with respect to the aircraft defines the vectoring direction produced in the nozzle (20).

Regarding the first actuating means (14) shown in FIG. 2a, that is, those configured to exert a pushing or pulling force on the second ring (12), they are responsible for the control of the nozzle (20) exit area (i.e., the divergent section) as well as the vertical vectoring of the nozzle (20) (i.e., pitch movement).

Regarding said pitch movement of the nozzle (20), or vertical vectoring, as previously described, it shall be regarded on the basis of the main axes of an aircraft, taking into account the arrangement of the nozzle (20) once the gas turbine engine is implemented in said aircraft. Thus, a pitch movement, as to its direction and sense of rotation, shall be understood as the movement of the divergent section of the nozzle (20) that, by means of the deflection produced in the gas stream, tends to increase or decrease the pitch angle of the aircraft when it is in straight flight.

As shown in FIG. 2a, the coordinated motion of the first actuating means (14) in the same direction causes the axial translation of the second ring (12), which can move with respect to the third ring (13). This axial movement of the second ring (12) also causes the displacement of the load struts (25), which in turn drag or push the diverging petals (23), depending on the direction of movement of the first actuating means (14), thereby opening (i.e., increasing) or closing (i.e., decreasing), respectively, the exit area of the nozzle (20).

As for the vertical vectorization, or pitch movement of the nozzle (20), if one of the first actuating means (14) pushes in one direction and the other one pulls in the opposite direction, vertical vectorization of the nozzle (20) is produced. In particular, the second ring (12) drags the third ring (13) (which, in turn, pivots respect to the first ring (11) around the two diametrically opposed cylindrical joints (16)).

In this sense, vertical vectorization of the nozzle (20) is also caused if the first actuating means (14) displace the actuation points in the same direction, but each one displacing the corresponding actuation point a different length.

Additionally, if each of the first actuating means (14) displaces the corresponding actuation point a different length, in addition to causing vertical vectorization of the nozzle (20) the exit area is modified.

In other words, if the first actuating means (14) displaces the actuation points a different length, the axial position of the second ring (12) varies so it modifies the exit area apart from vectorising the nozzle (20). However, if the first actuating means (14) displaces the actuation points the same length, but in opposite directions, the axial position of the second ring (12) is not modified, thus vectorising the nozzle (20) without modifying the exit area.

Regarding the second actuating means (15) shown in FIG. 2b, that is, those configured to exert a pushing or pulling force on the third ring (13), they are responsible for the control of the nozzle (20) throat area (27).

The coordinated motion of the second actuating means (15) in the same direction causes the axial translation of the third ring (13), which in turn drags the first ring (11) by virtue of their coupling by means of the two diametrically opposed cylindrical joints (16), which allow relative rotation, but no relative axial movement. This combined axial movement of the third (13) and first (11) ring causes the convergent petals (21) to pivot inwardly/outwardly, thus decreasing/increasing the area of the throat (27) thereby.

Finally, by virtue of the degrees of freedom described for the three rings (11, 12, 13) derived from their relative connections, the vectorization provided to the nozzle (20) will be controlled independently of the area ratio also provided for the throat section (27) and the exit area of the nozzle (20).

Figure 3:
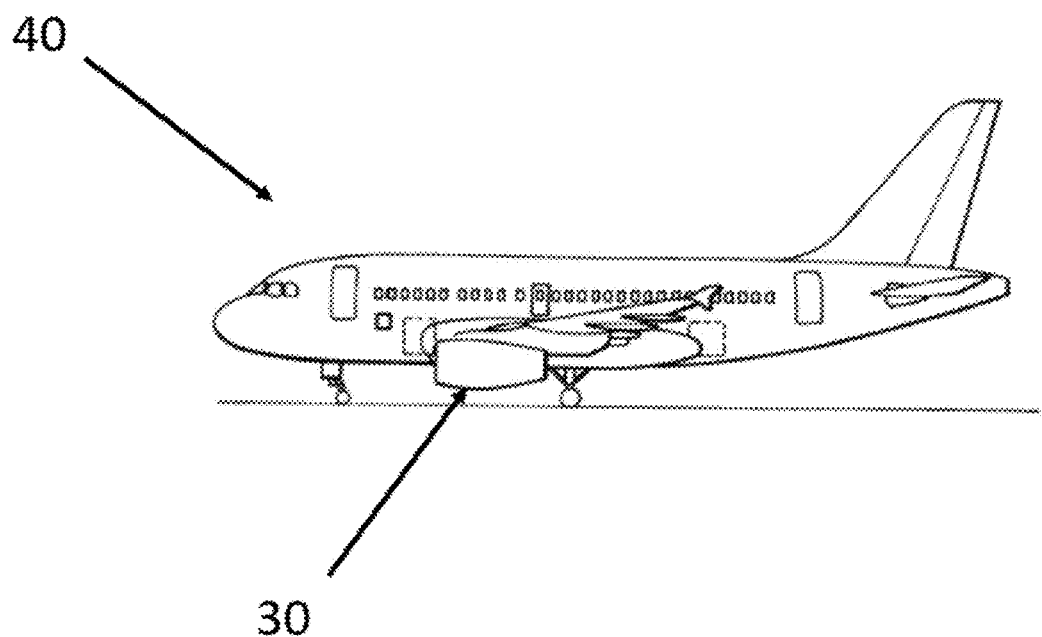
FIG. 3 This figure shows an aircraft comprising a turbo machine comprising a gas turbine engine according to an embodiment of the invention.

FIG. 3 depicts an aircraft (40), comprising a gas turbine engine (30) comprising a thrust vectoring variable geometry nozzle (20) according to an embodiment of the invention.

The invention claimed is:

1. An actuation mechanism for a thrust vectoring variable geometry nozzle of a gas turbine engine, the actuation mechanism comprising:
    a first ring;
    a second ring;
    a third ring;
    first actuating means; and
    second actuating means;
    wherein according to at least one operational status of the first and second actuating means the three rings are arranged concentrically and about a longitudinal axis;
    wherein the first actuating means are configured to exert a pushing or pulling force in the direction of the longitudinal axis on at least two diametrically opposed actuation points of the second ring; and
    wherein the second actuating means are configured to exert a pushing or pulling force in the direction of the longitudinal axis on at least two diametrically opposed actuation points of the third ring;
    wherein in said operational status of the first and second actuating means:
    the longitudinal axis and the line connecting the actuation points of the second ring define a first plane,
    the longitudinal axis and the line connecting the actuation points of the third ring define a second plane,
    the first plane and the second plane are perpendicular;
    and wherein:
    the first ring has the smallest diameter among the three rings, and is configured to be coupled to a distal fixed portion of the nozzle by means of an axial sliding joint arranged in the direction of the longitudinal axis, such that in an operating mode of the actuation mechanism the first ring is configured to move axially with respect to said distal fixed portion of the nozzle;
    the third ring is connected to the second ring by means of at least one axial sliding joint arranged in the direction of the longitudinal axis, such that the third ring and the second ring are configured to move axially relative to each other;
    the third ring being further connected to the first ring by means of at least one cylindrical joint arranged on the second plane, wherein said cylindrical joint is configured to allow relative rotation between the third ring and the first ring around a rotation axis perpendicular to the longitudinal axis.

2. The actuation mechanism according to claim 1, wherein the first actuating means are connected to the second ring by means of a spherical joint.

3. The actuation mechanism according to claim 1, wherein the second actuating means are connected to the third ring by means of a cylindrical joint.

4. The actuation mechanism according to claim 1, wherein the first actuating means comprise a pair of hydraulic actuators or a pair of electric actuators, each actuator connected to one of the two diametrically opposed actuation points on the second ring.

5. The actuation mechanism according to claim 1, wherein the second actuating means comprise a pair of hydraulic actuators or a pair of electric actuators, each actuator connected to one of the two diametrically opposed actuation points on the third ring.

6. The actuation mechanism according to claim 1, wherein the third ring is connected to the first ring by means of two diametrically opposed cylindrical joints arranged on the second plane.

7. The actuation mechanism according to claim 1, wherein at least one cylindrical joint comprises:
   a bolt provided on the first ring, said bolt being inserted in a hole provided on the third ring; or
   a bolt provided on the third ring, said bolt being inserted in a hole provided on the first ring.

8. The actuation mechanism according to claim 1, wherein the axial sliding joint provided between the second ring and the third ring comprises a bolt provided on one of the second and third rings, said bolt being inserted in an axial groove arranged parallel to the longitudinal axis, said axial groove being provided on the corresponding opposed second or third ring.

9. The actuation mechanism according to claim 1, wherein the second ring has a greater diameter than the third ring.

10. The actuation mechanism according to claim 1, wherein the third ring has a greater diameter than the second ring.

11. The actuation mechanism according to claim 1, wherein the second ring and the third ring have substantially the same diameter and wherein the first actuating means axially pass through the third ring.

12. A thrust vectoring variable geometry nozzle comprising:
   an actuation mechanism according to claim 1;
   a plurality of convergent petals, each convergent petal being coupled:
      by a corresponding pivot joint to the first ring; and
      by means of a cam joint to a distal fixed portion of the nozzle;
   a plurality of divergent petals, each divergent petal being coupled:
      at a proximal end thereof to a distal end of a convergent petal by means of a pivot joint;
      to the second ring of the actuation mechanism by means of a load strut,
   wherein each load strut is connected at one end to the second ring by means of a pivot joint, and at the other end to a corresponding divergent petal by means of a spherical joint.

13. The nozzle according to claim 12, wherein the cam joint comprises complementary interlocking means present in the convergent petals and in the distal fixed portion of the nozzle, respectively, such that axial movement of the first ring with respect to the distal fixed portion of the nozzle in the downstream direction according to the longitudinal axis pivots the convergent petals, deflecting them inwardly into the throat of the nozzle.

14. A gas turbine engine comprising a thrust vectoring variable geometry nozzle according to claim 12.

15. An aircraft comprising a gas turbine engine according to claim 14.

\* \* \* \* \*